Sept. 24, 1940.　　　F. KESSELRING　　　2,215,471
APPARATUS FOR RECTIFYING OR FOR CONVERTING ALTERNATING OR DIRECT CURRENT
Filed Jan. 13, 1937　　　3 Sheets-Sheet 1
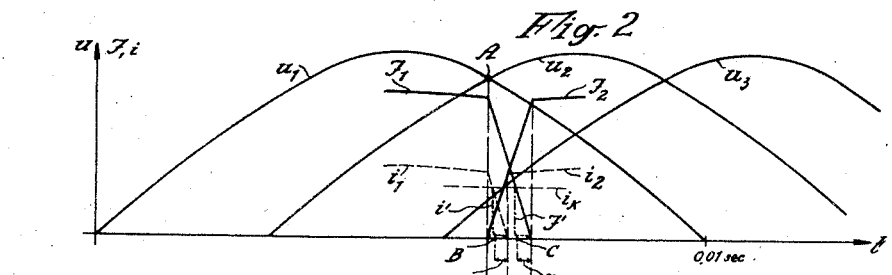
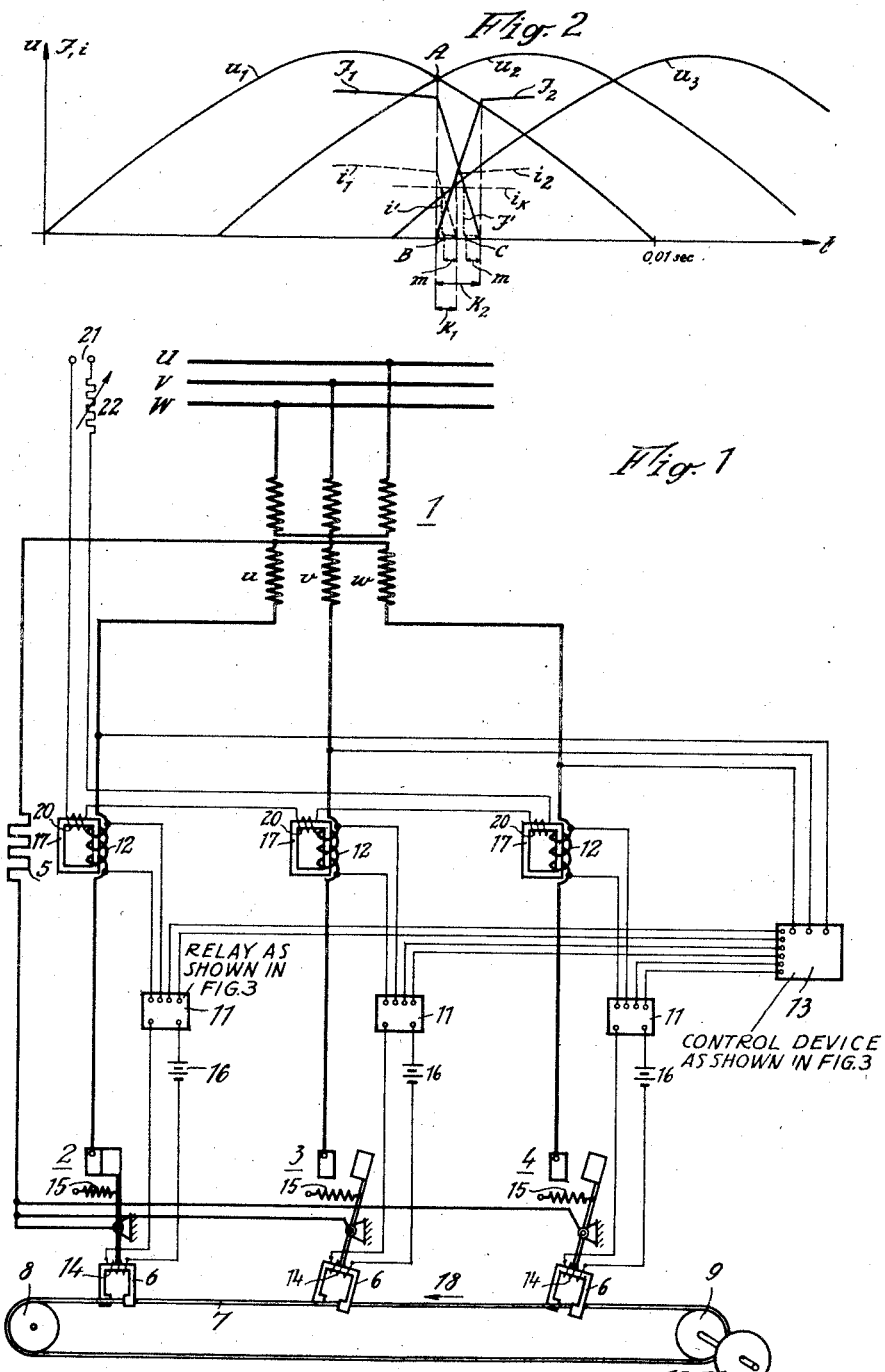

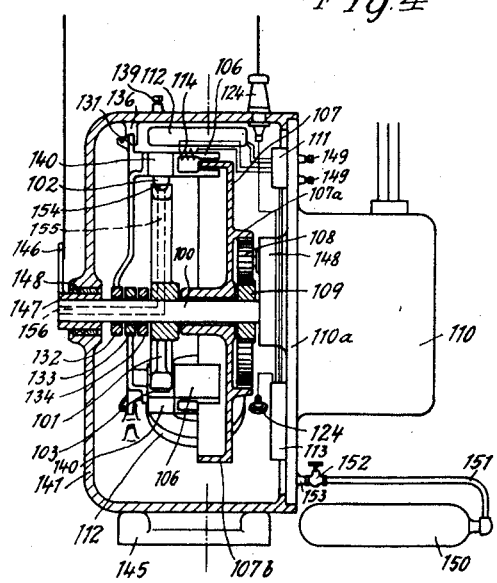

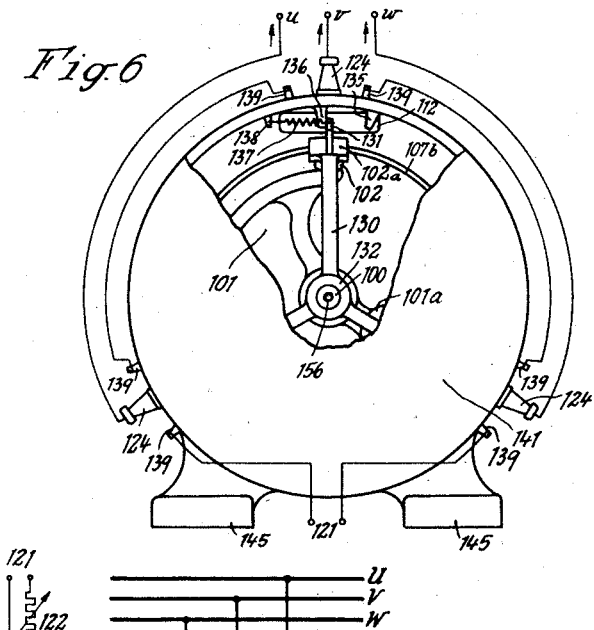

Patented Sept. 24, 1940

2,215,471

UNITED STATES PATENT OFFICE 2,215,471

APPARATUS FOR RECTIFYING OR FOR CONVERTING ALTERNATING OR DIRECT CURRENT

Fritz Kesselring, Berlin-Frohnau, Germany, assignor to Siemens-Schuckertwerke Aktiengesellschaft, Berlin-Siemensstadt, Germany, a corporation of Germany Application January 13, 1937, Serial No. 120,429
In Germany January 13, 1936

12 Claims. (Cl. 175—364)

My invention relates to apparatus for rectifying alternating current or for converting direct current into alternating current or for converting altenating current of one frequency into alternating current of a different frequency, and more especially to apparatus not operating with a continuous arc, but with movable contacts so that any gas discharge is limited to the time during which the commutation takes place.

An object of my invention consists in providing means, whereby the above-mentioned discharges are reduced to a minimum so as to attain an electric converting device simple in construction and reliable in operation.

Another object of my invention consists in adapting the commutating operation of a mechanically actuated converter to the load fluctuations of the converter.

Other objects of the invention will become apparent from the following description.

The invention is based on the idea that in a converter of the above-mentioned type, the current is interrupted in the current phase to be disconnected, only at the moment when the commutation current of this phase passes its zero value. In this case, the flow of current in the reverse direction can be avoided with certainty only if the opening gap, formed at the time when the current passes through its zero value, is able to withstand a high voltage without being punctured. In this respect it is possible to determine for each circuit breaking device certain contact distances which, if attained during the progressing opening movement of the contacts, prevent with certainty a reignition.

A difficulty arises from the fact that upon load fluctuations, the time necessary for the commutation, i. e. the interval between the closing of the commutation circuit and the passage of the current through the zero value, increases with increasing load. The known relatively sluggish control devices used in connection with rotary rectifiers, which permit shifting the instant of the contact separation in accordance with load variations, are only suitable for relatively slow fluctuations of load. For the purpose of the invention, i. e. to attain minimum gas discharges for all loads likely to occur in practice, this control must be able to follow load variations instantaneously even if they occur within a half cycle of the alternating current. To this end, according to a feature of my invention, the driving devices and the control devices are so designed as to have so little sluggishness that they control the contact separation in accordance with a definite instantaneous value or upon the rate of change of the descending curve portion of the current to be interrupted. These driving and control devices operate, therefore, with a speed adapted to the rapid variations of the commutation current and to the short period of commutation.

The magnitude and the rate of change of the commutation current, which determine the duration of the commutation period, are measurable at the moment when the circuit is closed. It is consequently possible to provide the necessary control of the contact movement, provided the control devices operate in a correspondingly rapid manner. If a little more time is desired for the control of the contact movement, the control device may be influenced only in dependence upon the magnitude of the load current flowing before the commutation period.

However, when the control of the contact movement is to be effected in dependence upon the rate of change of the decreasing current flowing in the decaying phase during the commutation period, a self-saturating reactor may be used, and the voltage induced in this reactor while it passes from the saturated to the desaturated state may be employed to operate a relay which governs the contact movement to be controlled.

The apparatus adjusting the moment at which the contacts are separated, must have such a small operating period that this adjustment is effected within the commutation period, i. e. within a time interval of the order of one-thousandth of a second, at normal operating conditions (50 cycle alternating current). To attain very short operating periods, the moving mass of the adjusting devices must be made as small as possible, and the force accelerating the mass as great as possible. The adjusting path should be made as short as possible, which may be accomplished by arranging the interrupting devices in a gaseous medium of high disruptive strength and under high pressure. Extinguishing devices may be used to clear the opening gap rapidly of the discharge carriers. The amplification of the control impulse for the force required to break the contacts must also be effected as far as possible without sluggishness, for instance by amplifier tubes or similar quick-acting devices.

Further features of the invention will be apparent from the following description taken in connection with the accompanying drawings in which some embodiments of my invention are illustrated. In the drawings:

Fig. 1 shows in diagrammatic form a polyphase rectifier according to my invention and the devices cooperating therewith, Fig. 2 is a graph showing the voltages and the currents of the same rectifier, Fig. 3 illustrates certain details of the arrangement of Fig. 1, Fig. 4 shows, partly in section, another form of another electric converting device according to my invention, Fig. 5 is a vertical sectional view taken on the line IV—IV of Fig. 4, Fig. 6 is an elevational view of the electric converting apparatus shown in Fig. 4 with the casing partly broken away, and Fig. 7 is a wiring diagram of the electric converting devices shown in Figs. 4 to 6 and of the apparatus cooperating therewith.

Referring at first to Fig. 1, 1 denotes a transformer connected to the three-phase supply circuit U, V, W. The currents of the three secondary phases $u$, $v$, $w$ flow through the interrupting devices 2, 3, 4 which may be designed in the form of known high-speed switches. These interrupting devices are so controlled that a rectified current feeding the current consuming device 5 may be taken from the secondary winding $u$, $v$, $w$ of the transformer 1. Springs 15 have a tendency to hold the interrupting devices 2, 3, 4 in the closed position. The opening of the interrupting devices is brought about by electromagnetic couplings 6 and a high-speed revolving body of relatively great mass formed of a steel belt 7, which is passing over two pulleys 8, 9 and driven by any suitable motor 10. The steel belt has polished surfaces and runs through a narrow gap between the pole pieces of the magnets, the clearance between both sides of the belt and the pole surfaces amounting only to a few hundredths of a millimeter. The purpose of this drive is to give the contacts 2, 3, 4 an acceleration as great as possible in the opening direction.

The control of the electromagnetic couplings 6 is effected by relays 11 to which control impulses for opening the switch contacts are supplied from reactor coils 12 connected in the respective phase leads from the transformer 1 to the contacts. Impulses for closing the switch contacts are supplied by means of a control device 13 actuated synchronously with the alternating current to be recified. The magnet windings 14 of the couplings 6 have direct current batteries 16 connected in their circuits, and closing springs 15 are provided for the moving switch contacts. As shown in detail in Figure 3, each relay 11 has a magnet core 11', with a movable armature carrying a contact 20 and provided with a spring 21 which normally holds the contact open. The core 11' carries an exciting winding 12', which is connected across the reactor 12 (Fig. 1), a holding winding 16' (Fig. 3) for the relay, this holding winding being connected to the battery 16 in series with the contact 20 and the coil 14 of the magnet coupling (Fig. 1), and finally, a further winding 13' connected with the control device 13. As shown in Fig. 1, there are three relays 11, one for each phase, but a single control device 13 arranged to cause energization of the coils 13' of three relays in turn. The relay 13 has a rotating contact 23, which is driven by a synchronous motor 22 connected to the supply mains UVW. The phase position of this motor may be accurately adjusted by a phase-shifter (not shown) or by rotating its stator winding relatively to the phase position of the feeding voltage. The rotating contact 23 of the relay 13 cooperates with stationary contacts $13u$, $13v$, $13w$, which are spaced at 120° intervals around the circle swept over by the contact. One side of each of the windings 13' is connected to the rotating contact 23 while the other sides of these three windings are respectively connected to the three phases of the supply mains and to the three contacts $13u$, $13v$, and $13w$ of the device 13. Thus as the contact 23 rotates, an impulse is supplied to the coil 13' of each relay 11 in turn. The reactors 12 are provided with iron cores 17 which are so proportioned that they are highly saturated during the main portion of the period of the flow of current, i. e., in the interval between two points at which the current passes the zero value and desaturated below the mean value of the current, particularly at very low current values, for instance, of $\frac{1}{100}$, $\frac{1}{1000}$ or $\frac{1}{10000}$ of the amplitude value, occurring in the neighborhood of the point at which the current passes the zero value. This desaturation has the effect to increase the resistance of the reactor at low intensities of the current to be interrupted, which increased resistance tends to further suppress the intensity value of the current. The result is a flattening distortion of the current curve in the vicinity of the zero passages of the curve. In other words, due to the periodical increase of the resistance of the reactors, intervals are periodically established during which the current intensity remains at a very low value. Therefore the interruption of the current need no longer take place at the exact moment of the zero passage but may be effected during an extended weak current interval. The reactors thus make it possible to control high operating current intensities of hundreds and thousands of amperes, whereas the current intensity at the time when the interruption is effected by opening the contacts, is of an order of magnitude of only one ampere. Consequently the sparking at the contacts is considerably suppressed and the consumption of the contact material is reduced to such an extent as to ensure operativeness for a remarkably long time of operation. Reactors of the type here referred to, are also described in the copending application, Koppelman, Serial No. 114,965, filed December 9, 1936. In the following, such reactors are designated as "switching reactors."

The magnet core 17 of the switching reactors (Fig. 1) consists preferably of high-grade steel, such as Permalloy or Hyperm, the magnetization curve of which presents a high initial permeability and a sharp saturation bend. Separate control windings 20 on the cores 17 serve to bias the cores with direct or alternating current from a power source 21 through a rheostat 22. These control means allow adjusting the conditions at which desaturation of the reactor occurs.

In order to explain the operation of the above-described converter arrangement, the commutation phenomena occuring in mechanically operating rectifiers of the type here concerned, will at first be described in a general way with reference to the diagram shown in Fig. 2. The time $t$ is plotted as abscissa, while the values of the voltage $u$ and the currents $J$ and $i$ are plotted as ordinate. At A the phase voltages $u_1$ and $u_2$ are equal. At this moment, two contacts of the rectifier are closed so that the two sequential phases carrying the voltages $u_1$ and $u_2$ are short-circuited. The closure of the contacts may be effected, as the case may be, before or after reaching the voltage equality in order to control the current in a known manner. Let $i_1$ be the current flowing in the first phase commutation. This current decreases in the period $k_1$ to the zero value. In the same period $k_1$ the current of the second phase increases from zero to the full value $i_2$. The separation of the contacts in the decaying first phase takes place at the instant B which is $m$ seconds before the zero passage of the current. The time $m$ is so chosen that the opening contacts of the decaying phase reach a break distance which is sufficiently great to effect quenching of the arc and to prevent with certainty a flow of current in the reverse direction.

If now the load increases from the value $i$ to the value $J$, then the current $J_1$ of the phase to be disconnected decays to zero in the period $k_2$, and in the same period $k_2$ the current in the incipient phase increases from zero to the full value $J_2$. The commutation period, therefore, has increased from the value $k_1$ to the value $k_2$. This dependency of the duration of the proper commutation period upon load variations is the cause of difficulties in known rectifying devices, as is already mentioned in the foregoing. It now will be explained, also with reference to Fig. 2, how the operation of the above-described arrangement according to the present invention differs from that of the known rectifiers.

By the contact control according to the invention the moment of the contact separation is shifted in accordance with load variations; i. e. when the current increases from $i_1$ to $J_1$, the contact opening is shifted from the instant B to the instant C. This retardation is such that the breaking of the contacts takes place, as previously $m$ seconds before the current $J_1$ of the phase to be disconnected passes through the zero value, and, therefore, the path produced is not greater than for the interruption. By the switching reactor 12 the curve of the commutation current is distorted compared to the above-described curve. The decaying portion of the commutation $J_1$, for instance, no longer corresponds to the full-line curve in Fig. 2, but follows the dot-and-dash portion $J'$. In other words, due to the desaturation of the core 17 of the reactor 12 and the rapid increase of the resistance of the reactor, the current curve is flattened and the current reaches a very low value some time before it passes through the zero value. A similar weak current interval occurs at smaller loads, as the current in the decaying phase no longer follows the descending branch of the broken line $i_1$ but is distorted as indicated by the dot-and-dash line $i'$. The operating periods of the relays 11 and 13 of the magnetic couplings 6, of the contacts 2, 3, 4, of the driving devices 7, 8, 9 and the magnetic bias of the switching reactors are so tuned that the points B and C (Fig. 2) at which the contacts are broken lie as far as possible at the beginning of the weak current interval and that at the moment at which the current passes the zero value the contact distance which is capable of preventing with certainty the flow of current in the reverse direction is attained, but not appreciably surpassed, i. e., for instance, the actual distance should not be greater than double the length of the mentioned minimum distance. In this case the circuit will be interrupted practically without sparking at all possible loads in operation, since both the effective range of the switching reactor and the contact break are automatically adapted to the varying period of commutation.

These automatic adjustments are obtained as follows: In the position shown in Fig. 1 the direct-current load is fed from the phase $u$. The magnetic coupling of the switch 2 is deenergized so that the switch is held closed by its spring 15, whereas the magnets of the switches 3 and 4 are energized. The pole pieces of the magnets of switches 3 and 4, owing to a small deformation of the magnets, contact with the steel belt 7 passing therebetween and are, consequently, displaced by the belt in the direction of the arrows 18. The switches 3 and 4 are, therefore, held in the open position against the action of the springs.

A moment later, i. e., as soon as the increasing phase voltage (voltage $u_2$ in Fig. 2) of the incipient phase $w$ is equal to the decreasing voltage ($u_1$ in Fig. 2) of the decaying phase $u$ (that is, at the instant A in Fig. 2), the rotating arm 23 of the device 13 (Fig. 3) engages the contact 13$w$, and the winding 13' of the relay 11 of phase $w$ is energized. This energization counteracts the effect of the holding coil 16' so that now the armature 20 is released and is moved by its spring 21 to the position shown in full lines in Fig. 3. The circuit of the battery 16 (Fig. 1) is thus broken in the phase $w$ and the contact 4, consequently, is closed by its spring 15. This establishes a short circuit of the phases $u$ and $w$ through the interrupters 2 and 4.

The alteration of current during the commutation sets up across the reactor coil 12 of phase $u$ (and also phase $w$ although this is not material) a voltage which drives a current through the exciting coil 12' of relay 11 of phase $u$. If the falling commutation current drops below the value at which the core 17 of the reactor 12 is saturated, a sudden increase in the rate of change of the current occurs, as a result of which the voltage across the reactor coil 12 increases, the excitation of the coil 12' being consequently also increased. This causes relay 11 to attract its armature 20 against the spring 21 and to close the circuit of the battery 16 through the holding coil 16', so that the armature remains attracted when the voltage produced in the coil 12 and consequently also the exciting current flowing through the coil 12' have ceased. By the attraction of the magnet armature, the battery circuit is also closed through the exciting coil 14 of the magnet coupling and the contact 2 (Fig. 1) is forced open and held in this position until the contact 23 (Fig. 3) returns to the position shown in dotted lines after completion of a revolution. During this rotation, the same operations are successively repeated in the phases $w$ and $v$, after which the cycle of operations recommences. As will be apparent from the above description, the rate at which this short-circuit current disappears, controls through the reactor 12 of the phase $u$ the production of the switching impulse for opening the switch contact 2. Due to the kinetic energy of the moving mass 7, which must be made high in comparison with the moving mass of the switch device, the moving contact of the switching device 2 is very rapidly opened as soon as the magnetic coupling is completed by the excitation of the coil 14. The acceleration of this opening motion is so great that the contacts are separated the necessary distance within a time of about one thousandth of a second. This break distance is attained at the moment at which the current of the phase to be disconnected passes its zero value. The arc formed between the contacts will, therefore, have the shortest length prior to its extinction. The contacts may be provided with extinguishing devices of known type.

The interrupting devices may be designed in the form of other high-speed switches, the contacts of which are opened under the action of powerful springs as soon as a holding magnet is demagnetized. Also with some known constructions of this type, it is possible to attain the extreme high break speeds which are essential for carrying out the invention.

If the switching reactors 12, 17 are rated for a greater inductance than as above described with reference to Fig. 2, the weak current pause is thereby lengthened. In this manner, a certain space time interval is attained. Therefore it is no longer necessary that the contact distance capable of preventing with certainty a flow of current in the reverse direction be attained at just that moment at which the current passes the zero value. This contact distance must, however, for all loads occurring in operation, be attained at the latest at that moment at which the instantaneous value of the current surpasses again the value of saturation of the reactor. It is preferable to arrange the driving apparatus and the control apparatus for the contacts 2, 3, 4 in such a manner that they always commence to open at the beginning of the weak current interval. An electric converting device thus equipped will utilize the current-reducing effect of the self-saturating switching reactor so as to improve the commutation for all loads occurring in operation, irrespective of the displacement of the points at which the current passes the zero value caused by the load fluctuations in such a manner that the sparking is substantially suppressed.

If the switching reactor is to be employed only for bringing about a weak current interval, a separate control reactor may be employed for controlling the contacts, the control reactor preferably being shunted across the main current path.

While the contact device shown in Fig. 1 is provided with reciprocatory contacts, Figs. 4 to 6 illustrate another electric converting device, the contact device of which is equipped with a revolving contact 101 and in which an additional switch motion, caused by the control devices, is imparted to the stationary counter-contacts 102, 103, 104 and superimposed upon their continuous rotation.

Fig. 7 shows a wiring diagram of this electric converting device in connection with the supply transformer 1 and the necessary auxiliary devices.

The revolving contact 101 is, as shown in Figs. 4 to 7, secured to the shaft 100. In the contact 101 is arranged a passage 155 for extinguishing gas. The passage 155 ends on the one hand in an opening 154 and on the other hand in a bore 156 of the shaft 100 leading to the outside atmosphere. A counter-weight 101a serves to compensate the revolving masses. The shaft 100 is mounted at one side in a metallic bushing 147 to which is connected a pole of the direct-current line with the terminal 146. The metallic bushing 147 is arranged with an insulating intermediate layer 148 in the casing 141. The shaft 100 is driven by the synchronous motor 110 whose end bearing shield 110a, designed in the form of a flange, is so secured to the casing 141 as to form a gas-tight closure thereof. The casing 141 is supported on feet 145. On the shaft 100 a disc 107 is loosely mounted. The latter has a flange 107a with internal gearing and is driven through an intermediate gear 108 by a pinion 109 firmly secured to the shaft, the gear 108 being mounted in the extension 148 of the end bearing shield 110a. The disc 107 rotates in a direction opposite to that of the revolving contact 101.

At the periphery of the circular path (shown in Fig. 5 as dash-and-dot circle) of the revolving contact 101 the stationary counter-contacts 102, 103, 104 are angularly spaced 120°. They are held by contact supports 140 which are secured with insulating arms 130 to three rings 132, 133, 134 loosely mounted on the shaft. The arms 130 are provided with extensions 131 and are held in the position of rest firmly in contact with the stops 136 by tension springs 137 secured to eyes 138. Further stops 135 are arranged in spaced relation to the stops 136 in the direction of rotation of the disc 107.

Magnets 106 provided with energizing windings 114 are secured to the contact supports 140. The pole pieces of these magnets are placed over the flange 107b of the disc 107, the flange 107b consisting, for instance, of ferromagnetic material. The exciting windings 114 are connected to the relays 111, which in turn are connected to the ends of the switching reactors 112 and the control device 113 through conductors which transmit the control impulses. The switching reactors 112 are connected to the stationary contacts 102, 103, 104 through flexible conductors. The other end of the switching reactors is connected through the terminals 124 to the secondary windings u, v, w of the supply transformer 1 whose primary winding is connected to the supply circuit U, V, W. Also the intermediate relay 113 is connected to the terminals 124. The devices 111 and 113 correspond to the devices 11 and 13 shown in Fig. 1. They are secured to the flange 110a. Auxiliary terminals 149 for the connection of direct-current sources 116 are arranged on the outer side of the flange 110a. The auxiliary terminals 149 are connected with the relays 111 by insulated conductors passing through the flange 110a. Further auxiliary terminals 139 are arranged on the casing 141. Insulated conductors lead from these terminals to the exciting windings 120 which serve to bias the iron cores 117 of the switching reactors 112. The auxiliary terminals 139 are connected in pairs with one another in such a manner that the biasing windings 120 are connected in series. From the outermost terminals extend conductors through a variable resistance 122 to a power source 121 which supplies the magnetization current.

On the flange 110a is further arranged a gas connecting nipple 153 to which is connected through a pressure-reducing valve 152 and a conduit 151 a steel flask 150 containing extinguishing gas. The flask 150 is easily interchangeable.

The synchronous driving motor 110 is connected to the secondary windings u, v, w of the supply transformer 1 through a phase advancer 119. The second pole of the direct-current conductor extends from the neutral point of these windings to the current consuming device 105 and then to the terminal 146 through a reactance coil 160.

In operation the contact 101 revolves in the direction in which it passes in the sequence indicated the stationary contacts 102, 103, 104. The disc 107 rotates in the opposite direction.

If, for instance, in the position shown the magnet secured to the contact 102 is energized by an impulse derived from the switching reactor 112 connected in series with the contact 102 and said impulse after amplification is transmitted by the relay 111 belonging to the same phase, the contact 102 is magnetically coupled to the revolving disc 107 and moved against the action of the spring 137. In this manner, the contact break is effected sooner than if the contact 102 would remain in its position of rest. The contact break thus commences at the beginning of the weak current interval caused by the switching reactor and the contact distance necessary for preventing backfires is attained at the latest at the end of the weak current interval.

The extinguishing gas, for instance air, flows from the flask 150 under high pressure through the conduit 151 and the valve 152 into the interior of the casing 141. The valve 152 reduces the gas pressure to a lower value, for instance, to 5 atmospheres. The whole casing 141 is, consequently, under a uniform inner superatmospheric pressure. The gas flows after having alternately extinguished the arcs at the contacts 102, 103, 104 through the opening 154 of the contact 101, through the passage 155 of this contact, through the passage 156 of the shaft 100 to the outside atmosphere. A collecting tank with a conduit may also be connected to the passage 156. The extinguishing gas collected in the tank may be purified, filled under pressure in flasks and employed again for the extinction of arcs.

While I have shown and described in detail two specific embodiments of my invention, it is to be understood that such showing and description is illustrative only, and for the purpose of making my invention more clear, and that the invention is not to be construed as limited to these details, nor to any of them, except insofar as such limitations are included with the terms of the following claims, in which it is my intention to claim all novelty inherent in my invention as broadly as is permissible in view of the prior art.

I claim as my invention:

1. An arrangement for converting alternating current into direct current or direct current into altenating current or alternating current of one frequency into alternating current of another frequency, comprising mechanical contact interrupters each having a movable contact and a counter-contact, driving means for periodically actuating said interrupters, means for transmitting the movement from said driving means to said movable contacts, and quick acting means for causing the opening of said interrupters to take place after the current to be interrupted has reached a predetermined instantaneous value which is lower than a current injurious to said contacts, said quick acting means being electrically coupled with the circuit of said converting device so as to be controlled in response to the current flow passing said device and being designed to react upon the current flow during the descendent curve part of the period immediately preceding the opening movement of the interrupter to be biased.

2. An arrangement for converting alternating current into direct current or direct current into alternating current or alternating current of one frequency into alternating current of another frequency, comprising mechanical contact interrupters each having a movable contact and a counter-contact, a common driving mechanism for periodically operating said interrupters, means for coupling said driving mechanism with said interrupters, and quick acting means for controlling the operation of said coupling, said quick acting means being electrically connected with the circuit of the converting device so as to be operated in response to the current flow passing the interrupter to be opened and being designed to effect the opening of said interrupter after the current has decreased below a predetermined instantaneous value which is lower than a current injurious to said contacts.

3. An arrangement for converting alternating current into direct current or direct current into alternating current or alternating current of one frequency into alternating current of another frequency, comprising mechanical contact interrupters each having a movable contact and a counter-contact, a drive for said movable contacts at the frequency of the current to be interrupted, and a quick acting current responsive device operatively connected with said counter-contacts and designed to impart an additional movement to said counter-contacts, whereby the moments at which the contacts are broken in the phase to be disconnected are shifted in response to the commutation current of the half cycle to be disconnected.

4. An arrangement having movable break contacts in each phase for converting alternating current into direct current or direct current into alternating current or alternating current of one frequency into alternating current of another frequency, comprising a drive for said contacts at the frequency of the current to be interrupted, an inductance in each phase connected in series with the contact of said phase, and a quick acting relay in each phase connected with said inductance of said phase so as to be energized by the voltage which is produced in said inductance by the commutation current and proportional to the speed with which the commutation current varies, said relay being designed to influence the movement of the contact of the phase to be disconnected in such a manner that when the current passes the zero value that length of the contact break is attained at which a flow of current in the reverse direction is prevented with certainty.

5. A multiphase current coverting device for converting alternating current into direct current or direct current into alternating current or alternating current of one frequency into alternating current of another frequency, comprising mechanical contact interrupters each having a movable contact and a counter-contact and each being disposed respectively in one of the phases of the circuit of the converting device, a drive for actuating said movable contacts with a definite frequency, a quick acting relay allotted to each of the phases of said circuit and being electrically coupled with said phase so as to be energized in correspondence with the current of said phase, and a quick acting device controlled by said relays and designed to impart a movement to said counter-contacts, whereby the moment at which each interrupter opened is shifted in accordance with the current flow passing said interrupter during the descending curve part of the current in the period immediately preceding the opening movement of said interrupter.

6. With a multiphase commutating device having movable break contacts for converting alternating current into direct current or direct current into alternating current or alternating current of one frequency into alternating current of another frequency, in combination, a drive for actuating said contacts at the frequency of the current to be interrupted, an inductor in each phase connected in series with the contact of said phase, an arrangement for biasing said inductor so as to desultorily increase its inductance during the commutation period, a quick acting relay allotted to each phase and connected with said phase so as to be energized in correspondence with the voltage produced in said inductor by the commutation current and proportional to the speed with which the commutation current varies, and means operatively connected with said relay for biasing the movement of said contacts of the phase to be disconnected in such a manner that when the current passes the zero value, that minimum contact distance is attained but not essentially surpassed at which the flow of current in the reverse direction is prevented with certainty.

7. A multiphase current converting device for converting alternating current into direct current or direct current into alternating current or alternating current of one frequency into alternating current of another frequency, comprising mechanical contact interrupters each having a movable contact and a counter-contact and each being disposed respectively in one of the phases of the circuit of the converting device, a drive for periodically actuating said movable contacts, an inductor connected in series with each of said interrupters, said inductors being designed to desultorily increase its inductance at the current values of the commutation period, a quick acting relay allotted to each phase and disposed to be energized in correspondence with the commutation current, and a quick acting device controlled by said relays and designed to impart an additional movement to said counter-contacts, whereby the moment at which each interrupter opened is shifted in accordance with the current flow passing said interrupter during the descending curve part of the current in the period immediately preceding the opening movement of said interrupter.

8. A commutating device having movable break contacts for converting alternating current into direct current or direct current into alternating current or alternating current of one frequency into alternating current of another frequency, comprising quick acting means for periodically actuating said contacts, and an inductance in each phase connected in series with the contacts of said phase, said inductance having a magnetic core designed for attaining its state of saturation desultorily at an instantaneous current value lying below the average current value, said means being designed for initiating the opening of said contacts as soon as the instantaneous value of the current of the phase to be disconnected lies below the value necessary for saturating said core and for attaining the minimum break distance at which at the different loads the flow of current in the reverse direction is prevented with certainty at the latest at the moment at which the instantaneous value of the current again attains the value of saturation of said core.

9. A converting arrangement for transferring energy between an alternating current circuit and another circuit of different current characteristic, a mechanical interrupter in each phase of said alternating current circuit, said interrupter having one of its contacts connected to said phase and the other connected with said other circuit, common driving means for operating said interrupters, said driving means being designed to run permanently during the operation period of the arrangement, an impedance in each of said phases series connected with the interrupter of said phase, an individual coupling disposed on each interrupter for periodically connecting said interrupter with said common driving means, said coupling having a magnetic device for effecting said connection, said magnetic device being electrically coupled with said impedance so as to be energized in correspondence with the current flowing through said interrupter, whereby each interrupter is actuated so as to open its phase circuit only after the current to be interrupted has decreased below a predetermined value.

10. In a converting arrangement for transferring energy between an alternating current circuit and another circuit of different current characteristics, an interrupting device having a movable contact and a counter-contact disposed between said circuits, means for actuating said movable contact with a given frequency, and quick acting means for imparting a movement to said counter-contact responsive to the energy transferred so as to shift the moment at which said interrupter opens in accordance with the energy amount passing said interrupter during the descending curve part of the current in the period immediately preceding the opening movement of said interrupter.

11. In a commutating arrangement for transferring energy between two circuits of different current characteristics, an interrupting device having a movable contact and a counter-contact disposed between said circuits, means for actuating said movable contact with the frequency of the current to be interrupted, an inductance series connected with said interrupter and designed to increase its inductance value at low current intensities within the commutation period, and quick acting means for imparting a movement to said counter-contact so as to shift the moment at which said interrupter opens with respect to the voltage cycle of the current to be interrupted, said quick acting means being connected with said inductance so as to effect said shifting in correspondence with the voltage produced in said inductance by the commutation current and proportional to the speed with which the commutation current varies.

12. In a commutating arrangement for transferring energy between two circuits of different current characteristics, an interrupting device having a movable contact and a counter-contact disposed between said circuits, means for actuating said movable contact with a given frequency, an inductance series connected with said interrupter and designed to increase its inductance value at low current intensities within the commutation period, and quick acting means for imparting a movement to said counter-contact responsive to the energy transferred so as to shift the moment at which said interrupter opens in accordance with the energy amount passing said interrupter during the descending curve part of the current in the period immediately preceding the opening movement of said interrupter.

FRITZ KESSELRING.